United States Patent

[11] 3,581,588

| | | | | |
|---|---|---|---|---|
| [72] | Inventor | Larry G. Eftefield Joliet, Ill. | | |
| [21] | Appl. No. | 3,792 | | |
| [22] | Filed | Jan. 19, 1970 | | |
| [45] | Patented | June 1, 1971 | | |
| [73] | Assignee | Caterpillar Tractor Co. Peoria, Ill. | | |

[54] CHAIN ADJUSTER
15 Claims, 5 Drawing Figs.

[52] U.S. Cl. .................................................. 74/242.14R, 91/206, 92/52, 92/117
[51] Int. Cl. ........................................................... F16b 7/10, F01b 15/00, F01b 7/20
[50] Field of Search .......................................... 74/242.14 R, 242.1 R; 92/52, 117; 91/206

[56] References Cited
UNITED STATES PATENTS

| | | | |
|---|---|---|---|
| 1,447,242 | 9/1923 | Fritz............................ | 92/117X |
| 2,917,277 | 12/1959 | Pine............................. | 91/206X |
| 2,984,469 | 5/1961 | Mavity........................ | 74/242.1(R)X |
| 3,028,693 | 4/1962 | Malzahn...................... | 74/242.1(R)X |
| 3,059,490 | 10/1962 | McDuffie.................... | 74/242.1(R) |

Primary Examiner—Leonard H. Gerin
Attorney—Fryer, Tjensvold, Feix, Phillips & Lempio

ABSTRACT: A hydraulic adjuster assembly is provided for the endless chain of an elevator to provide a means for easily adjusting the tension in the chain. The adjuster assembly is provided with a releasable mechanical lock means to prevent the transmission of forces to the adjuster after an adjustment has been made.

INVENTOR
LARRY G. EFTEFIELD

INVENTOR
LARRY G. EFTEFIELD

INVENTOR
LARRY G. EFTEFIELD

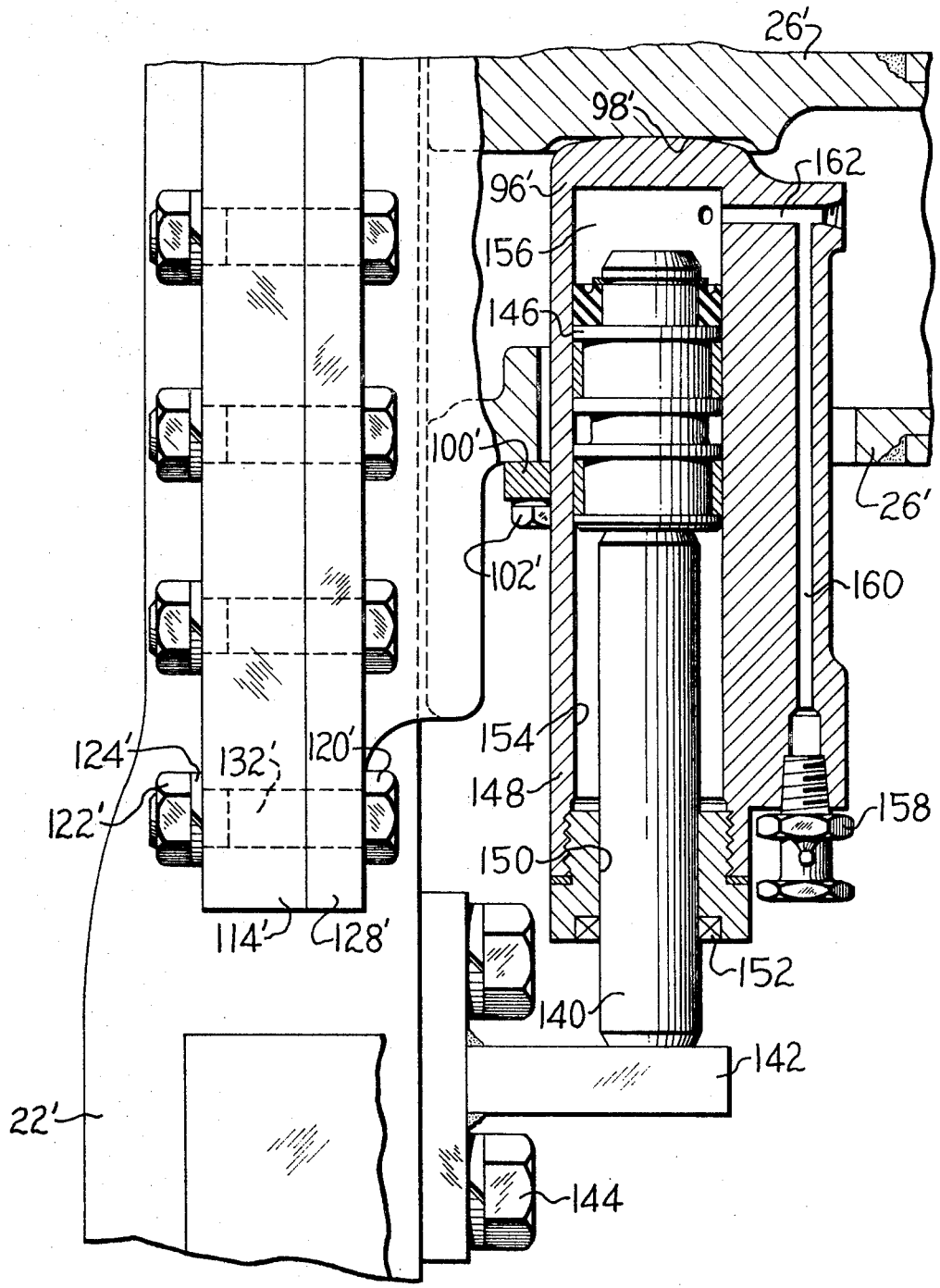

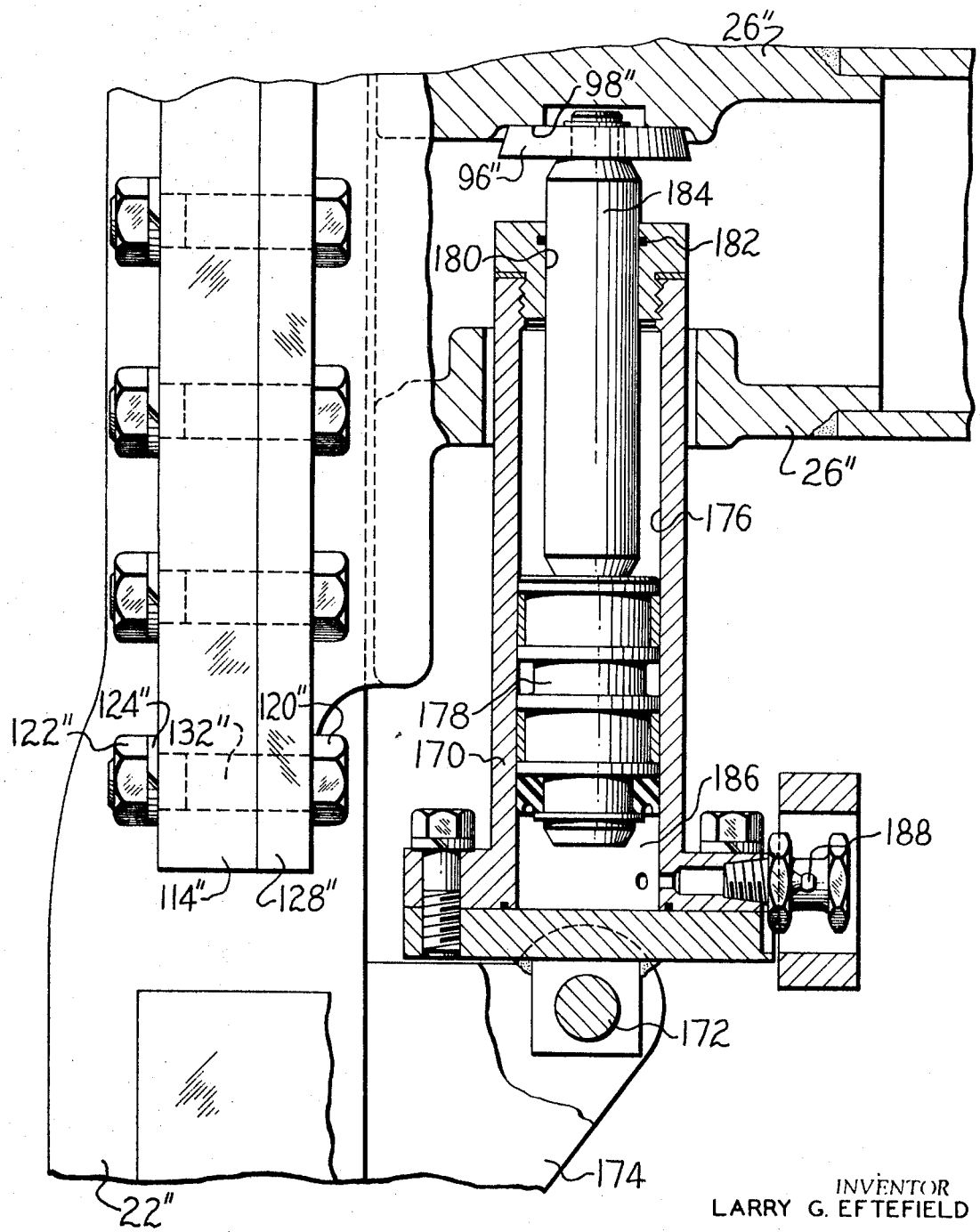

CHAIN ADJUSTER

BACKGROUND OF THE INVENTION

This invention relates to a hydraulic adjuster assembly for adjusting the tension in an endless chain. The invention is particularly applicable to the adjustment of endless chains which are used in elevator mechanisms such, for example, as are frequently employed in elevating scrapers. It should be appreciated, however, that the invention is also applicable to other mechanical embodiments wherein the tension in an endless chain requires periodic adjustment.

Proper chain tension adjustment is required to avoid excessive tightness in the chain which results in an undue amount of horsepower being used to drive the chain due to the high internal frictional forces. Proper chain adjustment is also required to avoid excessive slack in the chain which causes the chain to separate from the chain driving mechanism and sometimes breaks the chain. Excessive slack may also permit one chain to skip sprocket teeth relative to the opposite chain so that one end of a material carrying flight is advanced of the other end which can cause breaking of the chain. Proper chain adjustment is further required to maintain what may be called an optimal degree of sag in the chain.

With respect to the endless chain employed on the elevator of an elevating scraper, it is frequently required that the tension in the chain be adjusted, for example, every 200 hours of operation. With the known prior art chain adjusters an excessive amount of machine down time and labor is frequently required to make the adjustment.

One of the objects of the present invention is to provide a hydraulic chain adjuster which will make the adjustment of an endless chain a simple and low cost operation which can be carried out very quickly by the operator of the machine.

Another object of the invention is to provide a hydraulic chain adjuster which is operatively associated with the frame components of the machine and is equipped with mechanical locking means for releasably securing the frame components to each other in order to prevent the transmission of forces to the hydraulic adjuster after an adjustment has been made.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 4 is a fragmentary view, partially in section, illustrating the structural details of a modified embodiment of a hydraulic chain adjuster constructed in accordance with the present invention; and FIG. 5 is a fragmentary view, partially in section, illustrating the structural details of still another embodiment of a hydraulic chain adjuster constructed in accordance with the present invention.

DESCRIPTION OF THE PREFERRED EMBODIMENT

Figure 1:
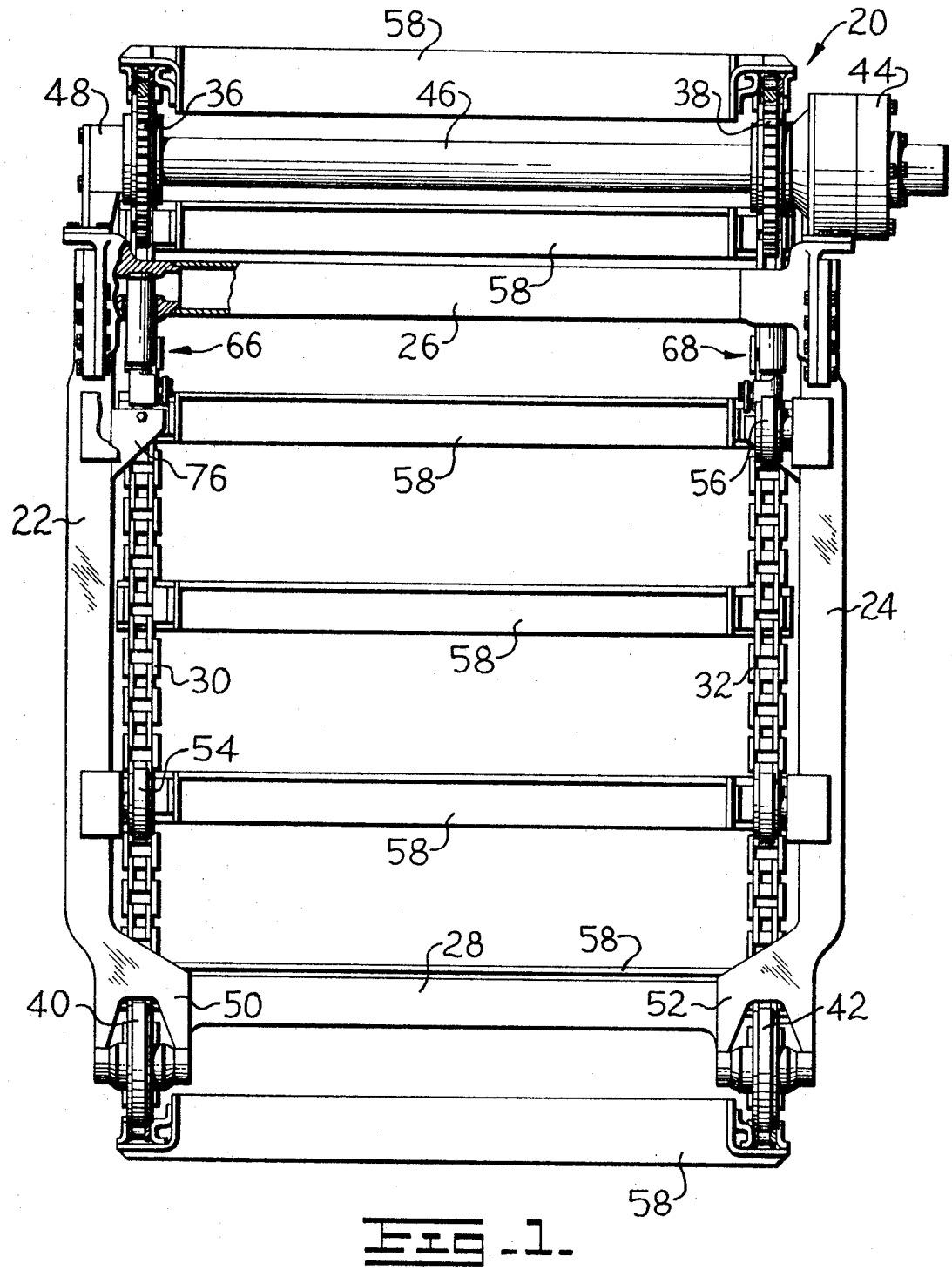
FIG. 1 is a longitudinal plan view, partially in section, illustrating the major components of an endless chain elevator which utilizes a hydraulic chain adjuster in accordance with the present invention.

In FIG. 1 an endless chain elevator is shown generally at 20. The elevator 20 is provided with a pair of longitudinal extending side frame members 22 and 24 and a pair of horizontally extending frame members 26 and 28 which are all connected together to form a rigid boxlike supporting structure. A pair of conventional endless chains 30 and 32 are rotatable about a pair of upper sprocket wheels 36 and 38 and a lower pair of idler wheels 40 and 42.

A suitable motor means 44 is attached to the upper end of side frame 24 for driving the sprockets 36 and 38. A drive shaft 46 extends outwardly from the motor 44 across the upper end of the frame and has its outer end journaled in a conventional bearing block 48. In this manner, the motor means positively drives both of the sprockets 36 and 38.

The lower idler wheels 40 and 42 are journaled in yoke elements 50 and 52 at the lower ends of each of the side frame members 22 and 24. Intermediate idler wheels are located on the side frames 22 and 24 such as are shown at 54 and 56. The endless chains 30 and 32 are connected to each other by a plurality of flights or slats 58 and these flights transport materials such as dirt from the lower end of the frame to the upper end of the frame where the material is dumped into a suitable container.

Figure 2:
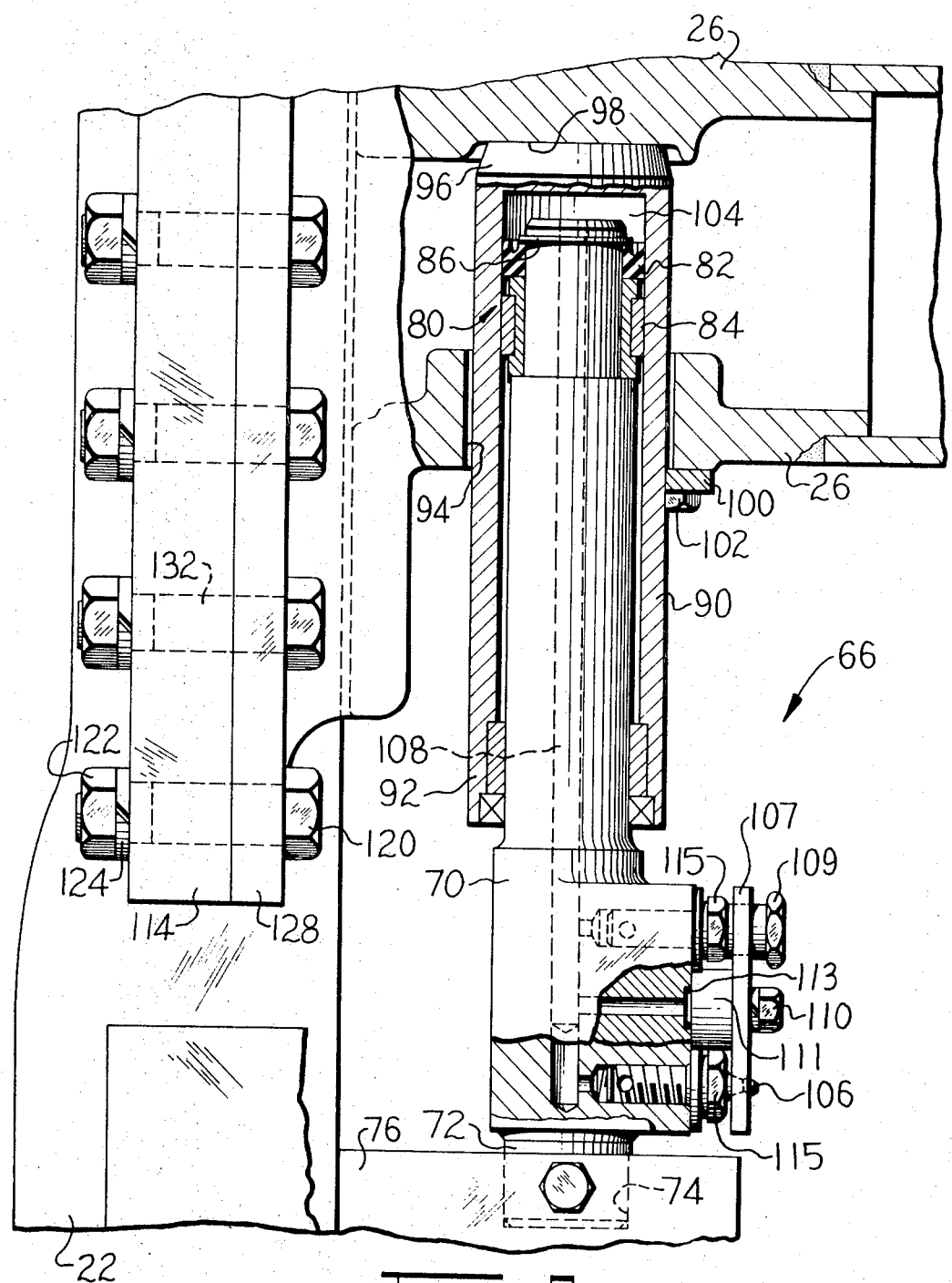
FIG. 2 is a fragmentary view, partially in section, illustrating the structural details of one embodiment of a hydraulic chain adjuster constructed in accordance with the present invention.

Referring now to FIG. 2 in conjunction with FIG. 1, it will be observed that a pair of adjuster mechanisms shown generally at 66 and 68 are provided at the upper ends of each of the side frame members 22 and 24. The function of the adjuster mechanisms is to move the upper horizontal frame member 26 in a longitudinal direction when it is desired to adjust the slack in the endless chains 30 and 32.

The details of the adjuster mechanism 66 will now be described with reference to FIG. 2, it being understood that the adjuster 68 is of identical construction. The adjuster 66 comprises a rod member 70 which has its lower end 72 firmly fastened inside a pilot hole 74 formed in a bracket member 76 which extends from the side rail 22. The upper end of the rod 70 is provided with an annular piston shown generally at 80. The piston 80 comprises a pair of seal elements 82 and 84 and the entire piston assembly is held in place at the upper end of the rod by means of a snapring 86. A cylinder 90 is slidably received on the rod 70 in sealed relation thereto. Additional bearing and sealing means 92 are provided internally of the cylinder at its lower end.

The cylinder 90 extends through an opening 94 formed in the lower portion of the frame 26 and the upper end 96 of the cylinder 90 is shaped so as to be received in a recessed portion 98 formed in the upper part of the frame member 26. In addition, an external bracket 100 is formed on the cylinder 90 so that the cylinder 90 may be rigidly secured to the frame 26 by bolts 102.

The upper end of the rod 70 forms with the interior of cylinder 90 a fluidtight variable volume chamber 104. A noncompressible fluid, such as grease, may be introduced into the chamber 104 through a conventional fitting 106 which communicates with an internal bore 108 formed in the center of the rod 70. A separate screw device 109 is provided to relieve pressure in the chamber 104 because an attempt to remove fitting 106 while the chamber 104 is under pressure could result in fitting 106 being ejected with considerable force.

As an additional safety feature, a plate 107 is provided which is fastened onto the cylinder 70 by bolt means 110. A spacer block 111 is provided between the plate 107 and the cylinder housing. The block 111 seals off a bore 112 which has an O-ring seal 113. The plate 107 is forked at each end allowing access to the outer ends of fittings 106 and 109. However, the hex heads 115 which must be turned to remove the fittings cannot be manipulated unless the bolt 110 is first loosened so that the plate 107 may be removed. Loosening of the bolt 110 also permits the block 111 to break its sealed connection with the O-ring 113 which in turn permits grease to escape from the chamber 104 via the bore 108 and the bore 112. Thereafter the fittings 106 and 109 may be removed without endangering the operator.

It will be understood that the admission of grease through the fitting 106 will tend to force the cylinder 90 upwardly on the rod 70 which in turn will move the horizontal frame member 26 with respect to the side frame members 22 and 24. Such movement of the horizontal frame member 26 will also move the sprockets 36 and 38 outwardly along the side frame members 22 and 24 to thereby take up slack in the endless chains 30 and 32. However, before the adjusters are actuated it is necessary to permit sliding movement between the horizontal frame member 26 and the side frame members 22 and 24.

Figure 3:
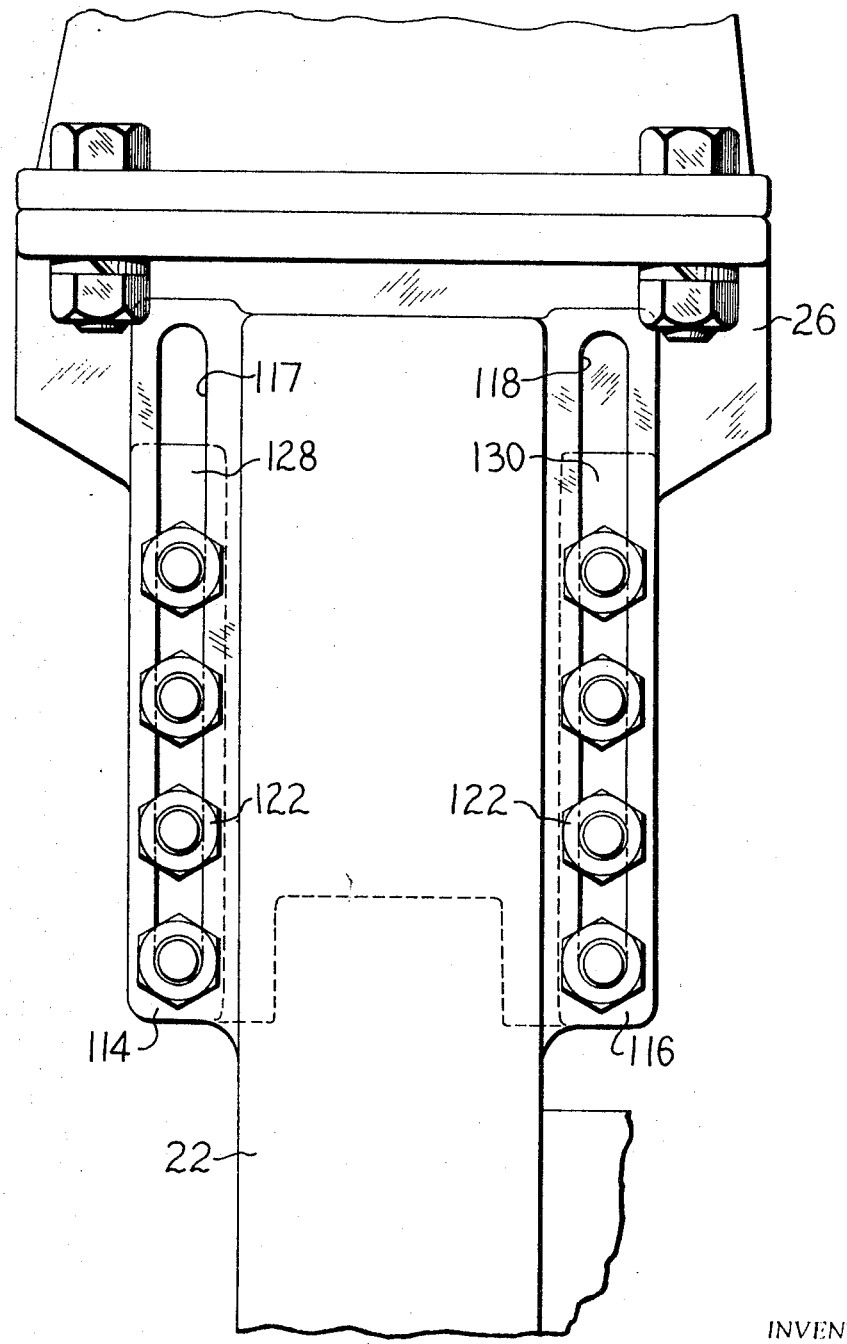
FIG. 3 is a longitudinal view illustrating certain details of the mechanical lock means associated with the hydraulic adjuster of the present invention.

Referring now to FIG. 3 in conjunction with FIG. 2, it may be noted that both the top and bottom surfaces of the side frame member 22 are provided with raised flanges 114 and 116. The raised flange elements 114 and 116 are each provided with a longitudinally extending slot 117 and 118 through which suitable bolt elements 120 may be passed and held in place by a nut 122 and lock washer 124.

The horizontal frame member 26 is also provided with a pair of flange elements 128 and 130 for sliding contact with the flange elements 114 and 116 of the side frame member 22. Each of the flange elements 128 and 130 are provided with a plurality of holes 132 through which the bolts 120 are passed. Thus, when the nuts 122 are loosened and grease is forced into the chamber 104 the horizontal frame member 26 will move longitudinally in an upward direction with respect to the side frame members 22 and 24. This longitudinal movement tightens the chains 30 and 32 after which the nuts 122 and bolts 120 may be tightened to rigidly hold the horizontal frame in its adjusted position.

FIG. 4 illustrates a modified embodiment of the invention. In FIG. 4 elements which are identical to those shown in FIG. 2 are given a primed (') numeral. As shown in FIG. 4 the adjuster comprises a rod member 140 which is supported at its lower end by a bracket member 142 which is secured to the side frame 22' by bolts 144.

The top of the rod 140 supports a free floating piston assembly 146 which is provided with annular sealing elements. A cylinder 148 is slidably received about the piston 146 in sealed relation thereto. The cylinder 148 is also provided with a bore 150 having seal means 152 for providing a sliding and sealed connection between the rod 140 and the cylinder 148.

By making the piston 146 and the rod 140 separate members the cylinder bore 154 which receives the piston 146 need not be exactly aligned or concentric with the cylinder bore 150 which receives the rod 140. Such a construction provides for a wider range of tolerances during the manufacturing operation of these components.

The upper end of the piston 146 forms with the interior of the cylinder 148 a fluidtight variable volume chamber 156. A noncompressible fluid, such as grease, may be introduced into the chamber 156 through a conventional fitting 158 which communicates the grease to the chamber 156 via the passageways 160 and 162.

As in the embodiment shown in FIG. 2, the elevator chain may be adjusted by loosening the bolts 120' and forcing grease into the chamber 156 to move the upper horizontal frame member 26' upwardly with respect to the side frame member 22'. After the adjustment is made the nuts 122' and bolts 120' may be tightened to rigidly hold the horizontal frame member in its adjusted position.

FIG. 5 illustrates another embodiment of the invention. In FIG. 5 elements which are identical to those shown in FIG. 2 are given a double primed ('') numeral. The adjuster of FIG. 5 comprises a cylinder 170 which is pivotally supported at 172 by a bracket member 174 which is secured to the side frame 22''.

The cylinder 170 has an internal bore 176 which slidably receives a free-floating piston 178. The piston is provided with suitable sealing elements to provide a sliding and sealed fit between the cylinder bore 176 and the piston. The upper end of the cylinder 170 is provided with a bore 180 which has a seal 182 for slidably and sealingly receiving a rod or ram 184. As in the construction shown in FIG. 4, the piston 178 and the rod 184 are constructed as separate members to provide for greater manufacturing tolerances. It is of course contemplated that the rod and piston could be integral, if desired.

The lower end of the piston 178 forms with the interior of the cylinder 170 a fluidtight variable volume chamber 186. A noncompressible fluid, such as grease, may be introduced into the chamber 186 through a conventional fitting 188. The tension in the chain may be adjusted by first loosening the bolts 120'' after which grease is forced into the chamber 186 which extends the rod 184 which in turn moves the horizontal frame member 26'' upwardly with respect to the side frame member 22''. After the desired adjustment has been made the bolts 120'' and 122'' are tightened to rigidly hold the horizontal frame 26'' in its adjusted position.

It will be observed that the orientation of the cylinder 170 and rod 184 are reversed from the embodiments shown in FIGS. 2 and 4. In addition, the pivotal mounting 172 permits cylinder 170 to pivot slightly during adjustment of the chain which helps prevent any binding of the cylinder components.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An elevator assembly comprising an elongated frame member; a movable frame member slidably received near a first end of the elongated frame member; mechanical lock means for releasably securing the movable frame member to the elongated frame member; a first rotatable member mounted on the movable frame member; a second rotatable member mounted near a second end of the elongated frame member; an endless chain mounted about the rotatable members; an adjuster mechanism for selectively moving the movable frame member with respect to the elongated frame member to thereby adjust the tension in the chain, said adjuster mechanism comprising a hydraulic jack having a rod end and a cylinder end; said rod and cylinder cooperating to form a fluidtight expansible chamber; said hydraulic jack having a first end operatively associated with the movable frame member and a second end operably associated with the elongated frame member; means for introducing a noncompressible fluid under pressure into the expansible chamber to extend the jack and move the movable frame member and associated rotatable member to an adjusted position with respect to the elongated frame member; said mechanical lock means operable to rigidly secure the frame members to each other to prevent the transmission of forces from the frame members to the jack after an adjustment has been made.

2. An elevator assembly as set forth in claim 1 and further comprising separate means for releasing fluid from the chamber to allow retraction of the jack.

3. An elevator assembly as set forth in claim 2 wherein the mechanical lock means for releasably securing the movable frame member to the elongated frame member comprises a first flange on the movable frame member having at least one hole therein; a second flange formed on the elongated frame member for slidably engaging the flange on the movable frame member and having an elongated slot extending therethrough; bolt means extending through said hole and said slot; and nut means received on one end of the bolt whereby when the nut is tightened the first flange is rigidly secured to the second flange.

4. An elevator assembly as set forth in claim 2 wherein the cylinder end of the jack is attached to the movable frame member and the rod end of the jack is attached to the elongated frame member.

5. An elevator assembly as set forth in claim 2 wherein the rod end of the jack is attached to the movable frame member and the cylinder end of the jack is attached to the elongated frame member.

6. An elevator assembly as set forth in claim 1 wherein the mechanical lock means for releasably securing the movable frame member to the elongated frame member comprises a first flange on the movable frame member having at least one hole therein; a second flange formed on the elongated frame member for slidably engaging the flange on the movable frame member and having an elongated slot extending therethrough; bolt means extending through said hole and said slot; and nut means received on one end of the bolt whereby when the nut is tightened the first flange is rigidly secured to the second flange.

7. An elevator assembly as set forth in claim 6 wherein the cylinder end of the jack is attached to the movable frame member and the rod end of the jack is attached to the elongated frame member.

8. An elevator assembly as set forth in claim 6 wherein the rod end of the jack is attached to the movable frame member and the cylinder end of the jack is attached to the elongated frame member.

9. An elevator assembly as set forth in claim 1 wherein the cylinder end of the jack is attached to the movable frame member and the rod end of the jack is attached to the elongated frame member.

10. An elevator assembly as set forth in claim 9 wherein the end of said rod which is received within said cylinder is provided with a piston thereon, said piston having seal means for providing a sliding and fluidtight connection between the piston and the internal wall of the cylinder.

11. An elevator assembly as set forth in claim 10 wherein the piston and the rod are independent elements and are not mechanically connected to each other.

12. An elevator assembly as set forth in claim 1 wherein the rod end of the jack is attached to the movable frame member and the cylinder end of the jack is attached to the elongated frame member.

13. An elevator assembly as set forth in claim 12 wherein the end of said rod which is received within said cylinder is provided with a piston thereon, said piston having seal means for providing a sliding and fluidtight connection between the piston and the internal wall of the cylinder.

14. An elevator assembly as set forth in claim 13 wherein the piston and the rod are independent elements and are not mechanically connected to each other.

15. An elevator assembly as set forth in claim 12 wherein the cylinder end of the jack is pivotally connected to the elongated frame member.